SHARP RISE-TIME HIGH-POWER PULSE TRANSMITTER

Filed Oct. 22, 1965

INVENTORS.
JOHN B. KENNEDY
MARK MANDEL
Richard I. Seligman
ATTORNEY

United States Patent Office 3,418,581

Patented Dec. 24, 1968

3,418,581

SHARP RISE-TIME HIGH-POWER PULSE TRANSMITTER

John B. Kennedy, Montville, and Mark Mandel, West Orange, N.J., assignors to International Telephone and Telegraph Corporation, a corporation of Delaware Filed Oct. 22, 1965, Ser. No. 501,044
6 Claims. (Cl. 325—141)

ABSTRACT OF THE DISCLOSURE

RF power for the amplifier of the transmitter is derived from a frequency multiplier fed by a crystal oscillator. In response to triggering signals from video circuits, a modulator turns on the RF amplifier for a given period and simultaneously applies one signal via a gating circuit to said frequency multiplier to turn it off while, during the same period, also applying pulses via a pulse shaping circuit and the gating circuit to the frequency multiplier to produce the transmitted short, sharp rise-time RF pulses.

Figure 1:
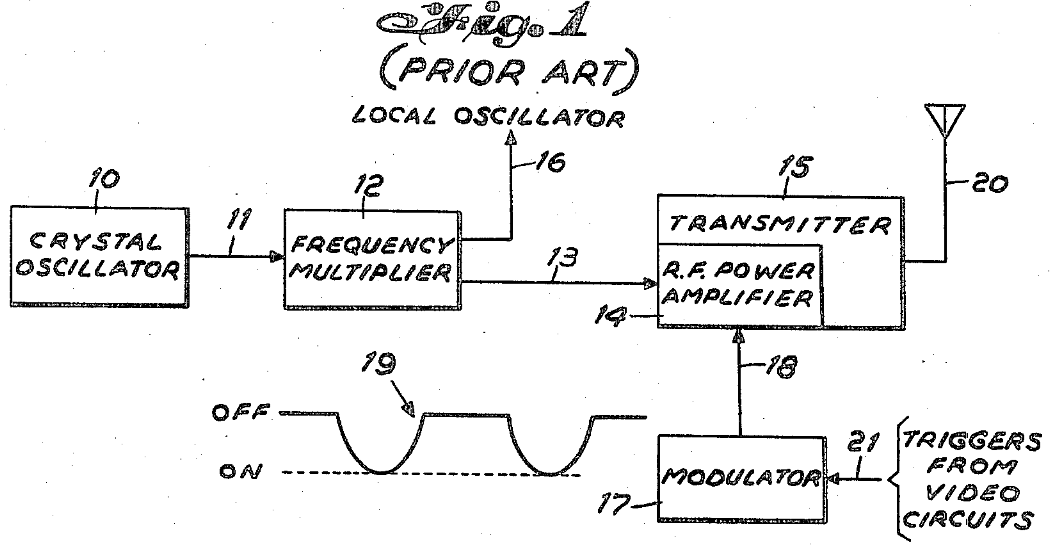
Fig. 1 (PRIOR ART)

This invention relates to apparatus for producing high power, high frequency, fast rise-time pulses and more particularly to apparatus for transmitting high power, high frequency, fast rise-time pulses, and also narrow-bandwidth pulses.

In radio navigation systems having a multiplicity of channels where pulse transmission is employed it is necessary that the pulses encompass a relatively narrow frequency band; and therefore be characterized by relatively slow rise-times; for example, in the radio navigation system commonly known as TACAN the pulses employed are rounded, approaching gaussian pulse shape, and have a rise-time of approximately one microsecond. A need exists for distance measuring equipment (DME) having a high resolution, short-range mode of operation; for example, in an air-to-air mode between helicopters. To provide same requires sharp rise-time pulses to eliminate problems associated with thresholding which can introduce large errors. Also, faster rise-time pulses minimize the addition of unwanted spurious effects in the pulse rise-time which could produce added inaccuracies. This high resolution mode of operation would be employed where traffic is relatively light and spilling over into other than the selected transmission channel would not be detrimental. In the event that an incorporation of IFF functions into the TACAN equipment occurs the IFF signals would require pulses with rise-times in the order of 0.1 to 0.2 microsecond which as hereinbefore stated would require a modification of the present TACAN transmission signal.

One method of achieving narrow pulses having sharp rise-times would be to provide a new modulator, but the complexity of the circuitry required to produce high-power pulses and the limitation in components for fast high-power switching make this method unattractive. Also, this method would require components large in size and weight, impractical limitations for airborne equipment.

Accordingly, it is an object of this invention to provide apparatus for furnishing high power, high frequency, sharp rise-time pulses.

Another object of this invention is to provide apparatus for furnishing fast rise-time pulses for airborne TACAN equipment in combination and compatible with present TACAN equipment.

In accordance with one aspect of the invention there is provided apparatus for transmitting high power, high frequency fast rise-time pulses, including means for generating continuous wave oscillations, a power amplifier, a modulator for gating on the power amplifier during a predetermined period of time in which pulses are to be transmitted, a gate to switch off the continuous wave oscillations during the aforementioned predetermined period, and means for rapidly triggering on the continuous wave oscillations during the gating period so that high power, fast rise-time pulses are produced at the output of the power amplifier.

Figure 2:
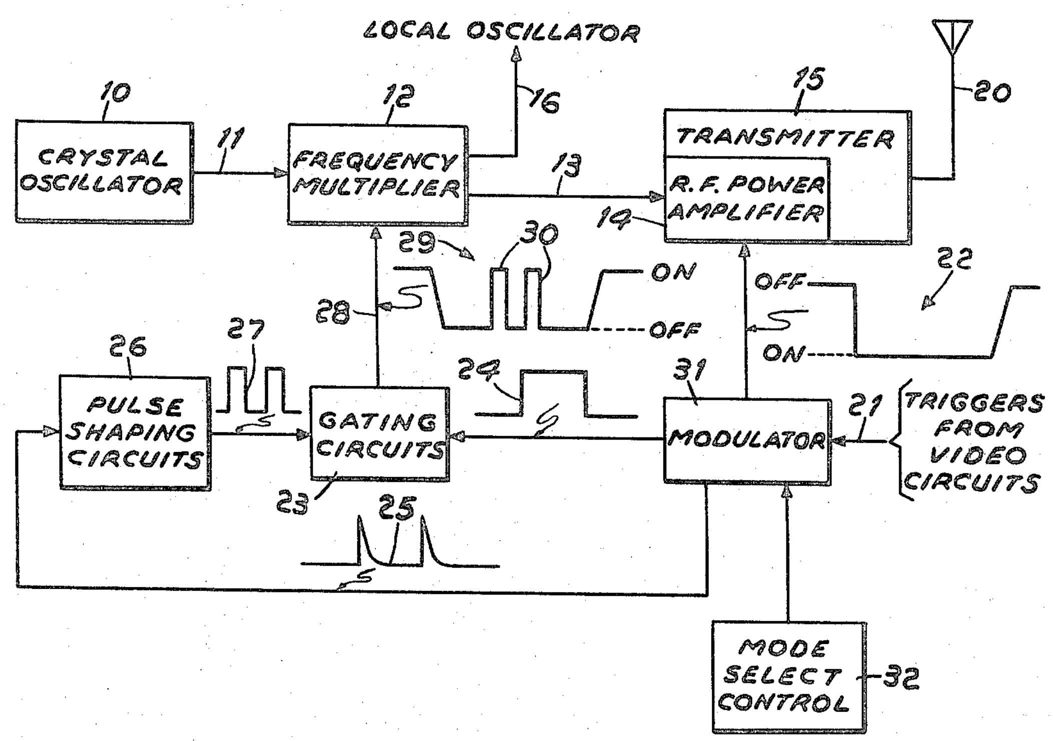

The above-mentioned and other features and objects of this invention will become more apparent by reference to the following description taken in conjunction with the accompanying drawings, in which:

FIGURE 1 is a simplified block diagram illustrating a prior art pulse transmitter and a representative waveform therefrom; and FIGURE 2 is a simplified block diagram illustrating a pulse transmitter and associated waveforms in accordance with the invention.

In the hereinafter described embodiment of the present invention fast rise-time, high power pulses are achieved by gating on the RF power amplifier of a transmitter and simultaneously gating off the source of RF energy, then, pulsing on the gated-off source with fast rise-time pulses, such that the gating-on pulses for the RF energy source need only be low power, but produce high power output pulses from the RF power amplifier.

FIGURE 1 illustrates a prior art method of producing pulses for the TACAN system comprising a crystal oscillator 10 the output 11 thereof being applied to a frequency multiplier 12. Airborne TACAN transmitters operate in the 1025 to 1150 megacycle band and since crystals of this frequency are unavailable a frequency multiplier 12 is required; of course, if this scheme would be used at lower frequencies to which crystals could be obtained then frequency multiplier 12 would be unnecessary. The output 13 from frequency multiplier 12 is applied to the RF power amplifier 14 of a transmitter 15. The output from multiplier 12 is also applied at 16 to the local oscillator (not shown) for injection into the mixer of a receiver (not shown). RF power amplifier 14 is modulated by a modulator 17 receiving trigger pulses from video circuit 21 (not shown), with the output from modulator 17 at 18 shown by waveform 19, which comprises pulses having relatively long rise-times to turn on the normally-off RF power amplifier thus producing a slow rise-time pulse output from the transmitter 15 at an antenna 20.

FIGURE 2 illustrates a practical embodiment employing the invention, comprising a crystal oscillator 10 having its output 11 coupled to a frequency multiplier 12 as shown hereinbefore with respect to the description of the prior art of FIGURE 1. Likewise the output from frequency multiplier 12 supplies a local oscillator at 16 and is also fed at 13 to an RF power amplifier 14 of a transmitter 15. A modulator 31 which receives input triggers from video circuits 21 (not shown) controls the output from RF power amplifier 14 by applying thereto a modulating signal 22.

Signal 22 is employed to turn on the normally-off amplifier for a period of time during which pulses transmission from transmitter 15 is to occur via antenna 20. Modulator 31 also applies a signal 24 to gating circuits 23 and a fast rise-time pulse signal 25 to pulse shaping circuits 26. The output 27 from pulse shaping circuits 26 is also applied to gating circuits 23.

Pulse shaping circuit 26 is required to provide properly formed pulses which are compatible with the equipment to use them; e.g., for IFF rectangular pulses having a width of approximately 0.5 microsecond would be needed. It is obvious, of course, that pulses 25 could be used without reshaping in a particular embodiment.

The output from gating circuits 23 is applied to frequency multiplier 12 via line 28. The signal along line 28 is as shown by waveform 29. Signal 29 initially turns off frequency multiplier 12 and then turns it on with sharp rising pulses 30 thus producing fast rise-time, *high-power* pulses at the output of RF power amplifier 14 by the use of sharp rise-time *low-power* pulses 30. In one embodiment waveform 29 is applied to one stage of frequency multiplier 12 to bias off that stage, with pulses 30 then used to gate the stage on again. It should be noted that the output from gating circuits 23 being applied to frequency multiplier 12 is only shown as one example. Other stages could be placed after frequency multiplier 12 and it could be these other stages which would be modulated by the output from gating circuits 23.

A mode select control 32 coupled to modulator 31 is provided to permit switching of modulator 31 to operate in the slow rise-time mode as described hereinbefore with reference to FIG. 1; that is the system of FIG. 2 has two modes of operation, one the standard mode where no modulating of frequency multiplier 12 occurs and RF amplifier 14 is modulated by signal 19 (see FIG. 1), and the second mode where RF amplifier 14 is gated on by signal 22 and frequency multiplier 12 is modulated by signal 29. Thus, slow rise-time pulses are provided for "standard" TACAN operation and fast rise-time pulses are provided, for example, to furnish an IFF capability.

The circuit described above should be able to provide output pulses having rise-times on the order of 0.1 microsecond. If not for the fact that the output from frequency multiplier 12 is used to supply the local oscillator along line 16 it would be unnecessary to turn off frequency multiplier 12 prior to pulsing it on with pulses 30. Instead frequency multiplier 12 could be maintained normally-off. The reason why RF power amplifier 14 is maintained normally-off and only turned on during the desired transmission period is to prevent spurious unwanted signals from being amplified by RF power amplifier 14 and being transmitted via antenna 20.

While we have described above the principles of our invention in connection with specific apparatus, it is to be clearly understood that the specification is presented by way of example and not as a limitation of the scope of our invention, as set forth in the accompanying claims.

We claim:

1. Apparatus for generating high power, high frequency, fast rise-time pulses, comprising:
- means to generate continuous wave oscillations;
- a power amplifier coupled to said generating means;
- a modulator coupled to said power amplifier for turning on said power amplifier for a predetermined period of time;
- means coupled to said modulator for gating said generating means off during said predetermined period of time; and
- means coupled to said generating means for triggering said generating means on with low level fast rise-time signals during said predetermined period of time, such that low power, fast rise-time triggering of said generating means produces high power, fast rise-time pulses from said power amplifier.

2. Apparatus for generating high power, high frequency, fast rise-time pulses as in claim 1 in which said generating means includes an oscillator and a frequency multiplier.

3. Apparatus for generating high power, high frequency, fast rise-time pulses as in claim 2 in which said triggering means is coupled to said frequency multiplier.

4. In a receiver-transmitter, apparatus for transmitting high power, high frequency, fast rise-time pulses, comprising:
- means to generate continuous wave oscillations;
- a transmitter coupled to said generating means;
- a modulator coupled to said transmitter for turning on said transmitter for a predetermined period of time;
- means including a gating circuit coupled from said modulator to said generating means for disabling said generating means during said predetermined period; and
- means including pulse shaping circuitry coupled from said modulator to said gating circuit, for applying pulses to said generating means via said gating circuit to turn on said generating means within said predetermined period during each of said pulses.

5. In a receiver-transmitter as in claim 4 wherein the output of said generating means is coupled to the local oscillator of the receiver.

6. Apparatus for selectively generating high power, high frequency, slow and fast rise-time pulses, comprising:
- means to generate continuous wave oscillations;
- a power amplifier coupled to said generating means;
- a modulator coupled to said power amplifier;
  - said modulator having dual mode of operation, a first mode for providing slow rise-time pulses by turning on said power amplifier with slow rise-time pulses, and a second mode for providing fast rise-time pulses by turning on said power amplifier for a predetermined period of time;
- a mode selected control coupled to said modulator for operating said modulator in said slow and fast rise-time modes;
- means coupled to said modulator for gating said generating means off in said second mode of operation during said predetermined period of time; and
- means coupled to said generating means in said second mode of operation for triggering said generating means on with low level fast rise-time signals during said predetermined period of time.

References Cited

UNITED STATES PATENTS

| | | | |
|---|---|---|---|
| 2,520,174 | 8/1950 | Slattery | 325—141 |
| 2,541,092 | 2/1951 | Page | 325—141 |

ROBERT L. GRIFFIN, *Primary Examiner.*

J. T. STRATMAN, *Assistant Examiner.*

U.S. Cl. X.R.

328—59; 343—6.5